US011341360B2

(12) United States Patent
Georghe

(10) Patent No.: US 11,341,360 B2
(45) Date of Patent: May 24, 2022

(54) ARTIFICIALLY INTELLIGENT UNIT-OF-ONE PATTERN CREATION FOR BESPOKE GARMENT FABRICATION

(71) Applicant: Resonance Companies LLC, New York, NY (US)

(72) Inventor: Christian Georghe, New York, NY (US)

(73) Assignee: RESONANCE COMPANIES LLC, New York, NY (US)

( * ) Notice: Subject to any disclaimer, the term of this patent is extended or adjusted under 35 U.S.C. 154(b) by 177 days.

(21) Appl. No.: 16/702,516

(22) Filed: Dec. 3, 2019

(65) Prior Publication Data

US 2021/0166068 A1 Jun. 3, 2021

(51) Int. Cl.
*G06K 9/62* (2022.01)
*G06Q 50/04* (2012.01)
*G06N 3/04* (2006.01)
*A41H 3/00* (2006.01)

(52) U.S. Cl.
CPC .......... *G06K 9/6227* (2013.01); *A41H 3/007* (2013.01); *G06K 9/628* (2013.01); *G06N 3/04* (2013.01); *G06N 3/0445* (2013.01); *G06N 3/0454* (2013.01); *G06Q 50/04* (2013.01)

(58) Field of Classification Search
CPC .............................. G06K 2209/40; G06N 3/08
See application file for complete search history.

(56) References Cited

U.S. PATENT DOCUMENTS

2014/0277663 A1* 9/2014 Gupta .................... G06Q 50/04
700/98
2020/0320769 A1* 10/2020 Chen .................... G06K 9/6256

FOREIGN PATENT DOCUMENTS

CN 110110770 A * 8/2019

* cited by examiner

Primary Examiner — Ross Varndell
(74) Attorney, Agent, or Firm — CRGO Global; Steven M. Greenberg

(57) ABSTRACT

A unit-of-one pattern creation method for bespoke garment fabrication includes loading into memory a test image of a base garment fitted on a model, processing the test image in a first convolutional neural network to generate different classifications for different portions of the base garment and flattening the different classified portions of the base garment to produce corresponding flattened patterns of the base garment. Thereafter, an image of a unique individual wearing a customer specific garment is acquired and processed in a second recurrent neural network trained with the different classifications of the first convolutional neural network. In response to the receipt of the acquired image in the second recurrent neural network, the second recurrent neural network classifies different portions of the acquired image and flattens the classified different portions of the acquired image in order to produce corresponding flattened patterns for a customized version of the base garment.

12 Claims, 2 Drawing Sheets

ARTIFICIALLY INTELLIGENT UNIT-OF-ONE PATTERN CREATION FOR BESPOKE GARMENT FABRICATION

BACKGROUND OF THE INVENTION

Field of the Invention

The present invention relates to computer aided fabrication of garments and more particularly to pattern drafting in garment development.

Description of the Related Art

In sewing and fashion design, a pattern is the template with which the parts of a garment are produced by placing the template upon fabric, tracing the perimeter of the template onto the fabric, cutting the traced portions of the fabric and assembling the cut portions of fabric into a garment. Patterns typically are formed from paper, and sometimes more rigid materials such as paperboard or cardboard so as to support repeated use. The process of making or cutting patterns is known as "patternmaking" and traditionally performed by a patternmaker who typically employs one of two methods to create a pattern. The first method is known as the flat-pattern method in which the entire pattern is drafted on a flat surface from measurements, using rulers, curves and straight-edges. The second method is known as drawing which involves creating a muslin mock-up pattern by pinning fabric directly on a form, and subsequently transferring the muslin outline and markings onto a paper pattern or using the muslin as the pattern itself.

The advent of computing has revolutionized patternmaking. Today, different computer applications facilitate the job of creating patterns by allowing the pattern maker to provide as data input to the application different measurements from which a pattern is generated computationally within a data processing system. Most applications additionally allow the pattern maker to fit individual measurements specifically, eliminating much fitting trial and error previously common in the sewing room. Indeed, the computational power of computing greatly eases the way in which garments are designed so as to more readily support not only mass-produced articles of clothing, but also custom, individually tailored garments known as "bespoke" articles.

Pattern utilization obviously lends itself well to the mass production of garments such that a discrete number of patterns are able to support the production of a wide range of different sizes of the same article of clothing. But, pattern utilization also works well in made-to-measure and bespoke garment fabrication. For made-to-measure garment fabrication, the pre-existing pattern is used to cut the relevant fabric which is then adjusted for the specific size of the customer, whereas in bespoke garment fabrication, a completely new pattern is created according to the measurements of the customer. In the latter circumstance, creating the pattern can be a manually intensive and thus time-consuming process.

To assist in the process of pattern making for bespoke manufacturing, three-dimensional imaging now integrates with computer automated pattern generation. Specifically, it is known today to acquire the measurements of an individual through the use of three-dimensional body scanning. Typically, three-dimensional body scanning is performed utilizing laser imaging in order to produce a computer representation of a scanned human form. Utilizing the scanned human form, a garment surface is defined in relationship to the dimensions of the human form reflected within the computer representation. Once the garment surface has been defined, it is a matter of computational mapping to generate a two-dimensional pattern for printing onto a paper medium using a conventional large format printer.

However, it is of note that three-dimensional body scanning lacks certain detail such as precise perimeter measurements about the surface of the human form. As well, three-dimensional body scanning is unable to readily reveal angular changes in respect to the curvature of the perimeter of the human form. Thus, patterns generated from three-dimensional body scanning lack a degree of precision desirable in producing optimally sized garments.

BRIEF SUMMARY OF THE INVENTION

Embodiments of the present invention address deficiencies of the art in respect to the creation of patterns in bespoke garment manufacturing and provide a novel and non-obvious method, system and computer program product for artificially intelligent unit-of-one pattern creation for bespoke garment fabrication. In an embodiment of the invention, a unit-of-one pattern creation method for bespoke garment fabrication includes loading into memory a test image of a base garment fitted on a model, processing the test image in a first convolutional neural network to generate different classifications for different portions of the base garment and flattening the different classified portions of the base garment to produce corresponding flattened patterns of the base garment. Thereafter, an image of a unique individual wearing a customer specific garment is acquired. Then, the acquired image is processed in a second recurrent neural network trained with the different classifications of the first convolutional neural network. In response to the receipt of the acquired image in the second recurrent neural network, the second recurrent neural network classifies different portions of the acquired image and flattens the classified different portions of the acquired image in order to produce corresponding flattened patterns for a customized version of the base garment.

In one aspect of the embodiment, the convolutional network includes a multiplicity of layers alternating between a convolutional rectified linear unit layer and a pooling layer. As well, a final layer of the convolutional network may include a softmax layer. Even further, a fully connected layer may precede the softmax layer in the convolutional network.

In another embodiment of the invention, a pattern generation data processing system is adapted for unit-of-one pattern creation for bespoke garment fabrication. The system includes a host computing system that includes at least one computer with memory and at least one processor. The system also includes a first convolutional network and a second recurrent neural network stored in the memory. The first convolutional network generates different classifications for different portions of an image of a base garment fitted on a model. The second recurrent neural network is then trained with the different classifications of the first convolutional neural network. Finally, the system includes a unit-of-one pattern generation module. The module includes computer program instructions executing in the memory of the host computing system and acquiring an image of a unique individual wearing a customer specific garment and processing the acquired image in the second recurrent neural network to classify different portions of the acquired image and to flatten the classified different portions of the acquired image to produce corresponding flattened patterns for a customized version of the base garment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for artificially intelligent unit-of-one pattern creation for bespoke garment fabrication. In accordance with an embodiment of the invention, a test image of a base garment sized for and worn by a fitting model of known body measurement may be acquired and stored in memory of a computer. The image is then provided as training input to a convolutional neural network stored in the memory in response to which the convolutional neural network produces different classifications for different portions of the base garment. Each of the different classified portions of the base garment are then flattened and stored in the memory. Thereafter, an image of a unique individual wearing a customer specific garment is received in the memory and submitted as input to a second recurrent neural network also in the memory and trained with the different classifications of the first convolutional neural network so as to classify different portions of the acquired image. In response, the second recurrent neural network flattens the classified different portions of the acquired image to produce corresponding flattened patterns for a customized version of the base garment. In this way, a pattern is uniquely generated in furtherance of a unit-of-one garment fabrication.

Figure 1:
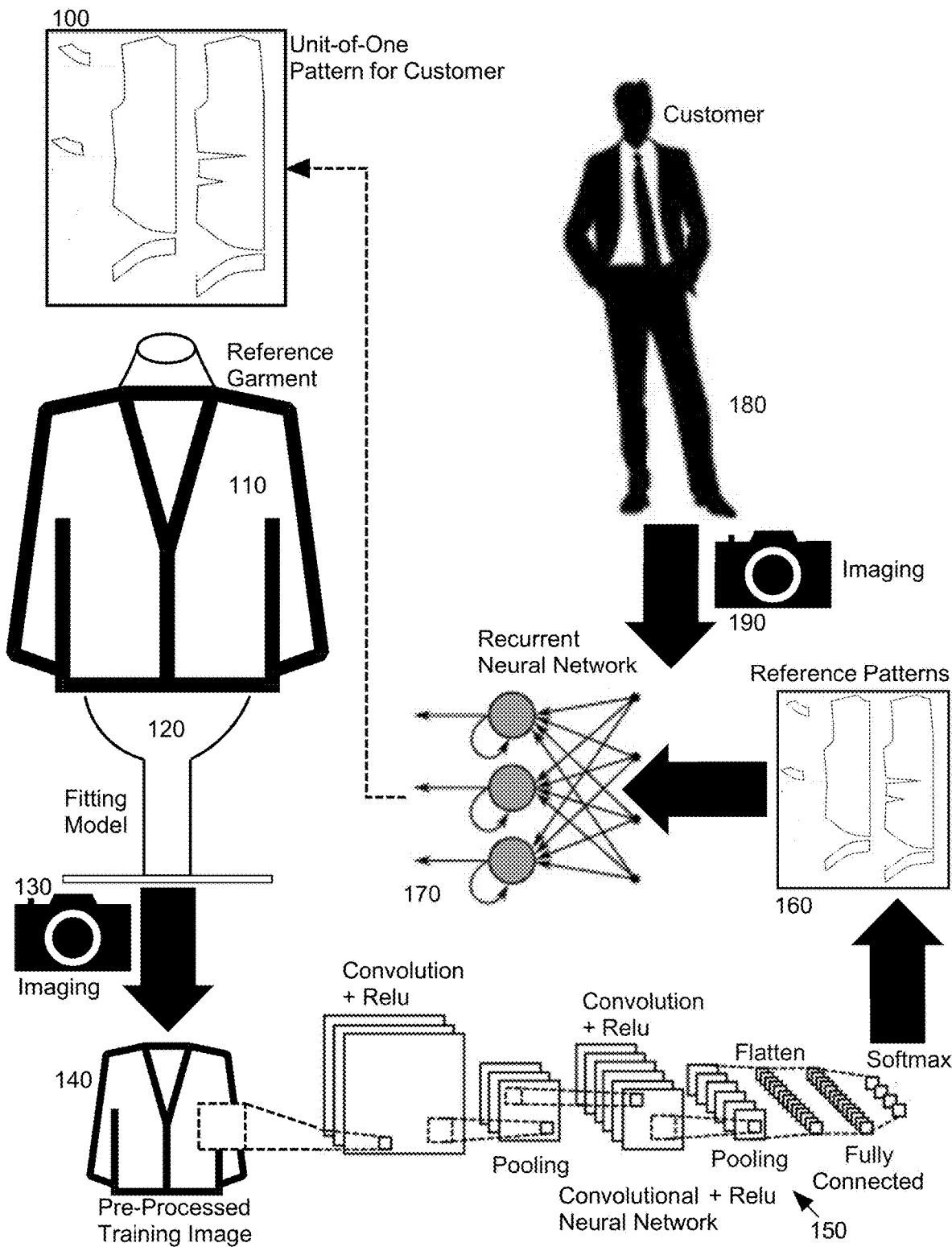
FIG. 1 is pictorial illustration of a process for artificially intelligent unit-of-one pattern creation for bespoke garment fabrication.

In further illustration, FIG. 1 pictorially shows a process for artificially intelligent unit-of-one pattern creation for garment fabrication. As shown in FIG. 1, a reference garment 110 is placed upon a fitting model 120 and imaged using an imaging device 130 in order to produce a pre-processed training image 140 of the reference garment 110. The pre-processed training image 140 is then provided as input to a first convolutional neural network 150. The first convolutional neural network 150 provides for alternating layers of a convolutional rectified linear unit layer and a pooling layer as can be seen. The output of the alternating layers is flattened and then presented to a fully-connected layer of the first convolutional neural network 150. Finally, a softmax layer is provided at the output of the first convolutional neural network 150 so as to produce a set of classifications of different portions of the reference garment 110 correlated to measurements in a reference pattern 160.

The classifications produced by the first convolutional neural network 150 are then provided as training input to a second, recurrent neural network 170. Once training, the second, recurrent neural network 170 receives by way of imaging device 190, an image of a customer 180 wearing a specific garment. The consequence of providing the image of the customer 180 wearing the specific garment is a set of deviations from the reference pattern 160. The set of deviations from the reference pattern 160 so as to produce a unit-of-one pattern 100 specific to the customer 180. The unit-of-one pattern 100 may then be reduced to print and used in a templated fabrication process for fabricating a bespoke form of the reference garment 110.

Figure 2:
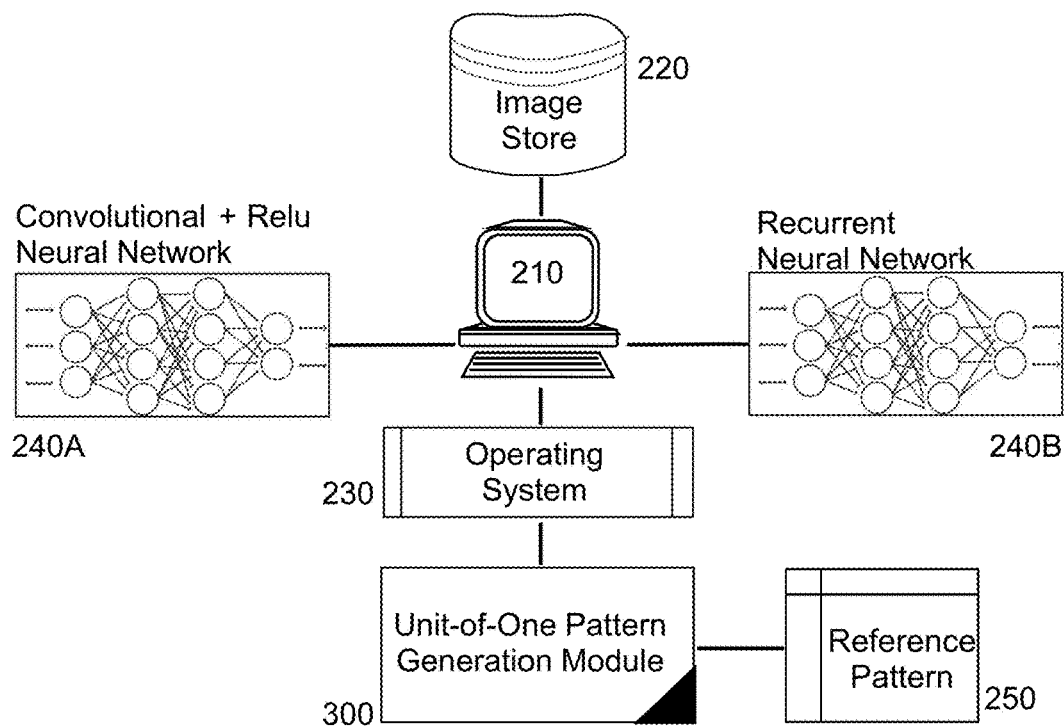
FIG. 2 is a schematic illustration of a data processing system adapted for artificially intelligent unit-of-one pattern creation for bespoke garment fabrication; and, FIG. 3 is a flow chart illustrating a process for artificially intelligent unit-of-one pattern creation for bespoke garment fabrication.

The process described in connection with FIG. 1 may be implemented in a data processing system. In more particular illustration, FIG. 2 schematically shows a data processing system adapted for artificially intelligent unit-of-one pattern creation for garment fabrication. The system includes a host computing system 210 that includes one or more computers, each with memory and at least one processor. The host computing system supports the execution of an operating system 230 which in turn manages the operation of a unit-of-one pattern generation module 300. In this regard, the unit-of-one pattern generation module 300 include computer program instructions operable when executing in the host computing system 210 to perform a process of artificially intelligent unit-of-one pattern creation.

More specifically, the computer program instructions are operable to train in memory of the host computing system 210, a first convolutional neural network 240A utilizing imagery of a reference garment disposed on a fitting model and stored in image store 220 so as to classify the reference garment and to correlate the classifications into a reference pattern 250 for the reference garment. In this regard, first convolutional neural network includes multiple different alternating convolutional rectified linear unit layers and pooling layers disposed before a flattening layer, a fully connected layer and finally a softmax layer. The computer program instructions are additionally operable to train a second, recurrent neural network 240B with the classifications produced by the first convolutional neural network so as to identify deviations from the reference pattern 250. Finally, the computer program instructions are operable to process a contemporaneously acquired image of a customer wearing a specific garment in the second, recurrent neural network 240B so as to identify requisite deviations from the reference pattern 250 so as to produce a unit-of-one pattern suitable for use in fabricating a bespoke form of the reference garment.

Figure 3:
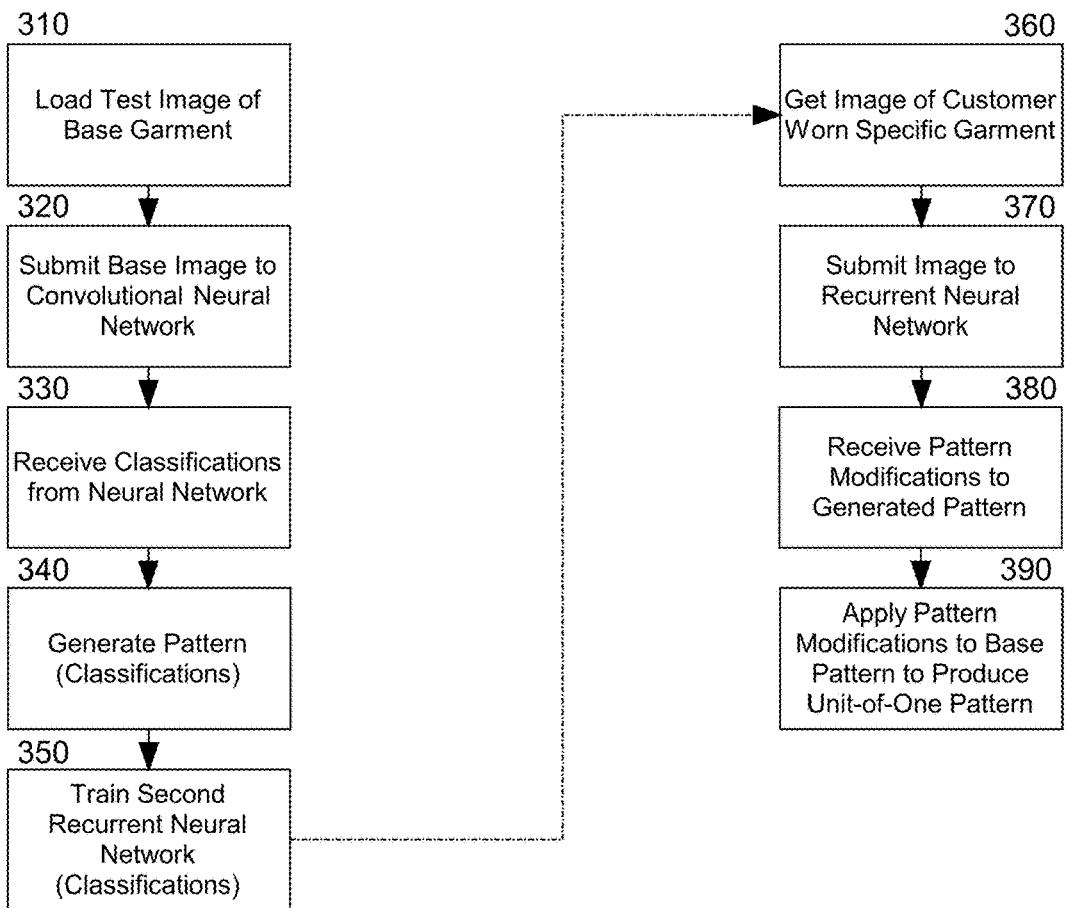

In even yet further illustration of the operation of the unit-of-one pattern generation module 300, FIG. 3 is a flow chart illustrating a process for artificially intelligent unit-of-one pattern creation for garment fabrication. Beginning in block 310, a test image of a base garment is loaded from an image store into memory of the host computing system. Then, in block 320, the base image is provided to a first, convolutional neural network so as to classify the base image. In block 330, the classifications of the base image are received from the first convolutional neural network and in block 340, a reference pattern is generated for the base image based upon the classifications. As well, in block 350 the classifications are provided as training input to a second, recurrent neural network.

Thereafter, in block 360, a contemporaneously acquired image of a customer wearing a specific garment is received into the memory of the host computing system. As such, in block 370 the contemporaneously acquired image is provided to the now training second, recurrent neural network. In response, in block 380 the second, recurrent neural network produces as output, a set of modifications to the reference pattern corresponding to the nature of the contemporaneously acquired image. Finally, in block 390, the produced modifications are applied to the reference pattern so as to produce a unit-of-one pattern to be utilized in the fabrication of a bespoke form of the reference garment.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description; but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A unit-of-one pattern creation method for bespoke garment fabrication, comprising:
   loading into memory a test image of a base garment fitted on a model;
   processing the test image in a first convolutional neural network to generate different classifications for different portions of the base garment;
   flattening the different classified portions of the base garment to produce corresponding flattened patterns of the base garment;
   acquiring an image of a unique individual wearing a customer specific garment; and,
   processing the acquired image in a second recurrent neural network trained with the different classifications of the first convolutional neural network to classify different portions of the acquired image and to flatten the classified different portions of the acquired image to produce corresponding flattened patterns for a customized version of the base garment, the second recurrent neural network producing as output, a set of modifications to the base garment which are then applied to the base garment so as to produce a unit-of-one pattern to be utilized in the fabrication of a bespoke form of the base garment.

2. The method of claim 1, wherein the convolutional network comprises a multiplicity of layers alternating between a convolutional rectified linear unit layer and a pooling layer.

3. The method of claim 1, wherein a final layer of the convolutional network comprises a softmax layer.

4. The method of claim 3, wherein a fully connected layer precedes the softmax layer in the convolutional network.

5. A pattern generation data processing system adapted for unit-of-one pattern creation for bespoke garment fabrication, the system comprising:
  a host computing system comprising at least one computer with memory and at least one processor;
  a first convolutional network and a second recurrent neural network stored in the memory, the first convolutional network generating different classifications for different portions of an image of a base garment fitted on a model, the second recurrent neural network having been trained with the different classifications of the first convolutional neural network; and,
  a unit-of-one pattern generation module comprising computer program instructions executing in the memory of the host computing system, the computer program instructions:
  acquiring an image of a unique individual wearing a customer specific garment; and,
  processing the acquired image in the second recurrent neural network to classify different portions of the acquired image and to flatten the classified different portions of the acquired image to produce corresponding flattened patterns for a customized version of the base garment, the second recurrent neural network producing as output, a set of modifications to the base garment which are then applied to the base garment so as to produce a unit-of-one pattern to be utilized in the fabrication of a bespoke form of the base garment.

6. The system of claim 5, wherein the convolutional network comprises a multiplicity of layers alternating between a convolutional rectified linear unit layer and a pooling layer.

7. The system of claim 5, wherein a final layer of the convolutional network comprises a softmax layer.

8. The system of claim 7, wherein a fully connected layer precedes the softmax layer in the convolutional network.

9. A computer program product for unit-of-one pattern creation method for bespoke garment fabrication, the computer program product including a non-transitory computer readable storage medium having program instructions embodied therewith, the program instructions executable by a device to cause the device to perform a method including:
  loading into memory a test image of a base garment fitted on a model;
  processing the test image in a first convolutional neural network to generate different classifications for different portions of the base garment;
  flattening the different classified portions of the base garment to produce corresponding flattened patterns of the base garment;
  acquiring an image of a unique individual wearing a customer specific garment; and,
  processing the acquired image in a second recurrent neural network trained with the different classifications of the first convolutional neural network to classify different portions of the acquired image and to flatten the classified different portions of the acquired image to produce corresponding flattened patterns for a customized version of the base garment, the second recurrent neural network producing as output, a set of modifications to the base garment which are then applied to the base garment so as to produce a unit-of-one pattern to be utilized in the fabrication of a bespoke form of the base garment.

10. The computer program product of claim 9, wherein the convolutional network comprises a multiplicity of layers alternating between a convolutional rectified linear unit layer and a pooling layer.

11. The computer program product of claim 9, wherein a final layer of the convolutional network comprises a softmax layer.

12. The computer program product of claim 11, wherein a fully connected layer precedes the softmax layer in the convolutional network.

* * * * *